(12) United States Patent
Rongala et al.

(10) Patent No.: US 12,536,419 B2
(45) Date of Patent: Jan. 27, 2026

(54) COMPUTER-IMPLEMENTED OR HARDWARE-IMPLEMENTED METHOD OF ENTITY IDENTIFICATION, A COMPUTER PROGRAM PRODUCT AND AN APPARATUS FOR ENTITY IDENTIFICATION

(71) Applicant: IntuiCell AB, Stockholm (SE)

(72) Inventors: Udaya Bahskar Rongala, Lund (SE); Henrik Jörntell, Lund (SE)

(73) Assignee: IntuiCell AB, Stockholm (SE)

( * ) Notice: Subject to any disclaimer, the term of this patent is extended or adjusted under 35 U.S.C. 154(b) by 25 days.

(21) Appl. No.: 18/615,189

(22) Filed: Mar. 25, 2024

(65) Prior Publication Data
US 2024/0242065 A1 Jul. 18, 2024

Related U.S. Application Data

(63) Continuation of application No. 18/046,906, filed on Oct. 14, 2022, now Pat. No. 11,941,510, which is a continuation of application No. 17/635,210, filed as application No. PCT/SE2021/050589 on Jun. 16, 2021, now Pat. No. 11,507,805.

(30) Foreign Application Priority Data

Jun. 16, 2020 (SE) .................................... 2030199-0
Nov. 25, 2020 (SE) .................................... 2051375-0

(51) Int. Cl.
*G06N 3/048* (2023.01)
(52) U.S. Cl.
CPC .................................... *G06N 3/048* (2023.01)
(58) Field of Classification Search
CPC .................................................... G06N 3/048
(Continued)

(56) References Cited

U.S. PATENT DOCUMENTS 7,814,038 B1  10/2010  Repici
7,904,398 B1   3/2011  Repici
(Continued)

FOREIGN PATENT DOCUMENTS

CN       115004220 A    9/2022
EP         0410805      1/1991
(Continued)

OTHER PUBLICATIONS

Nose et al., "Personal Identification based on Sole Pressure Distribution using a Hetero-core Optical Fiber Sensor Network for Personal Web Services", 2009 Congress on Services-I, 2009 (Year: 2009).*

(Continued)

*Primary Examiner* — Tsu-Chang Lee
(74) *Attorney, Agent, or Firm* — Noréns Patentbyrå AB

(57) ABSTRACT

Methods and apparatus, including computer program products, for identifying characteristics in time-varying information data. A network of nodes receives input comprising time-varying information data. An activity level is generated by each node based on the input and/or an input combination of time-varying information data. The activity level of each node is compared to a threshold level. Based on the comparing, the activity level is set for each node to a preset value, or the generated activity level is kept. A total activity level is calculated as the sum of all activity levels of the nodes of the network. If a condition for the total activity level being a local minimum of the total activity level has not been met, the providing, generating, comparing, setting, calculating and determining are repeated. Otherwise, a distribution of activity levels is utilized at the local minimum to identify a measurable characteristic of the data.

13 Claims, 5 Drawing Sheets

(58) Field of Classification Search
USPC .......................................................... 706/20
See application file for complete search history.

(56) References Cited

U.S. PATENT DOCUMENTS

| | | | |
|---|---|---|---|
| 9,015,093 | B1 | 4/2015 | Commons |
| 10,417,563 | B1 | 9/2019 | Commons et al. |
| 2008/0258767 | A1 | 10/2008 | Snider et al. |
| 2012/0131309 | A1 | 5/2012 | Johnson et al. |
| 2012/0249827 | A1 | 10/2012 | Wootton et al. |
| 2015/0106306 | A1 | 4/2015 | Birdwell et al. |
| 2015/0112909 | A1 | 4/2015 | Wierzynski et al. |
| 2015/0178617 | A1 | 6/2015 | Canoy et al. |
| 2015/0179040 | A1* | 6/2015 | Nishihara ............. H04W 4/026 340/539.12 |
| 2015/0206049 | A1 | 7/2015 | Canoy et al. |
| 2015/0269481 | A1 | 9/2015 | Annapureddy et al. |
| 2015/0278680 | A1 | 10/2015 | Annapureddy et al. |
| 2016/0300252 | A1* | 10/2016 | Frank .................. G06F 21/6245 |
| 2017/0031334 | A1* | 2/2017 | Medelius ........... A61B 5/14542 |
| 2018/0189631 | A1 | 7/2018 | Sumbul et al. |
| 2018/0211128 | A1 | 7/2018 | Hotson et al. |
| 2018/0309451 | A1 | 10/2018 | Lu et al. |
| 2018/0357504 | A1 | 12/2018 | Zamir et al. |
| 2019/0087975 | A1 | 3/2019 | Versace et al. |
| 2019/0244079 | A1 | 8/2019 | George et al. |
| 2019/0279078 | A1 | 9/2019 | Cambou et al. |
| 2019/0392306 | A1 | 12/2019 | Negishi et al. |
| 2020/0057937 | A1 | 2/2020 | Ushakov |
| 2020/0104709 | A1 | 4/2020 | Mohammadi et al. |
| 2020/0184337 | A1 | 6/2020 | Baker |
| 2020/0257966 | A1 | 8/2020 | Dumoulin et al. |
| 2020/0301668 | A1 | 9/2020 | Li |
| 2020/0301874 | A1 | 9/2020 | Shainline |
| 2020/0394521 | A1 | 12/2020 | Baker |
| 2021/0004688 | A1 | 1/2021 | Baker |
| 2021/0142086 | A1 | 5/2021 | Berkovich et al. |
| 2021/0178600 | A1 | 6/2021 | Jha et al. |
| 2021/0216049 | A1 | 7/2021 | Brown |
| 2021/0295168 | A1 | 9/2021 | Xu et al. |
| 2022/0245429 | A1 | 8/2022 | Zimmermann et al. |
| 2022/0269929 | A1 | 8/2022 | Rongala et al. |
| 2022/0292331 | A1 | 9/2022 | Zimmermann et al. |
| 2022/0329847 | A1 | 10/2022 | Parashar et al. |
| 2022/0374679 | A1 | 11/2022 | Bazhenov et al. |
| 2023/0079847 | A1 | 3/2023 | Ren |
| 2023/0087722 | A1 | 3/2023 | Ren |

FOREIGN PATENT DOCUMENTS

| | | | |
|---|---|---|---|
| EP | 3293681 | A | 3/2018 |
| EP | 3866105 | A | 8/2021 |
| GB | 2562529 | A | 11/2018 |
| JP | 2006285489 | A | 10/2006 |
| JP | 2009027036 | A | 2/2009 |
| JP | 2011242932 | A1 | 12/2011 |
| JP | 2019040421 | A | 3/2019 |
| WO | 2017148536 | A1 | 9/2017 |
| WO | 2018220566 | A1 | 12/2018 |
| WO | 2019074532 | A1 | 4/2019 |
| WO | 2020152129 | A1 | 7/2020 |
| WO | 2020165629 | A1 | 8/2020 |
| WO | 2020210673 | | 10/2020 |
| WO | 2020233851 | | 11/2020 |
| WO | 2022141445 | A1 | 7/2022 |

OTHER PUBLICATIONS

Alemdar et al., "Wireless sensor networks for healthcare: A survey", Computer Networks 54 (2010) 2688-2710, 2010 (Year: 2010).*
C. J. Rozell et al.: "Sparse Coding via Thresholding and Local Competition in Neural Circuits", Neural Computation, vol. 20, No. 10, Oct. 1, 2008(Oct. 1, 2008), pp. 2526-2563, XP055473418,US.
U. B. Rongala et al.: "Cuneate spiking neural network learning to classify naturalistic texture stimuli under varying sensing conditions", Neural Networks, vol. 123, Dec. 9, 2019 (Dec. 9, 2019), pp. 273-287, XP085996225.
Supplementary European Search report, Jun. 22, 2024, Application No. 21826523.9, European patent office.
Final Notice issued Dec. 15, 2021, for priority Swedish Patent Application No. 2051375-0.
First Notice issued Jul. 2, 2021, for priority Swedish Patent Application No. 2051375-0.
International Search Report and Written Opinion mailed Jul. 15, 2021, for priority International Patent Application No. PCT/SE2021/050589.
International Search Report ancl Written Opinion mailed Mar. 28, 2023, for corresponding International Patent Application No. PCT/SE2023/050153.
International Search Report and Written Opinion mailed Apr. 24, 2023, for corresponding International Patent Application No. PCT/SE2023/050185.
International Search Report and Written Opinion mailed Mar. 29, 2023, for corresponding International Patent Application No. PCT/SE2023/050104.
International Search Report and Written Opinion mailed May 16, 2023, for corresponding International Patent Application No. PCT/SE2023/050406.
International Search Report and Written Opinion mailed Nov. 17, 2022, for corresponding International Patent Application No. PCT/SE2022/050766.
International Search Report and Written Opinion mailed Nov. 25, 2022, for corresponding International Patent Application No. PCT/SE2022/050767.
Markos Markou el al.; Novelty detection: a review—part 2: neural network bases approaches; 2003; pp. 2499-2521; Signal Processing 83.
Office Action Dated April 5; 2023; for corresponding Swedish Patent Application No. 2250397-3.
Office Action dated Dec. 8, 2022, for corresponding Swedish Patent Application No. 2250550-7.
Office Action Dated May 10, 2022, for corresponding Swedish Patent Application No. 215110-1.
Office Action Dated May 10, 2022, for co1-responding Swedish Patent Application No. 2151099-5.
Office Action dated Nov. 10, 2022, for corresponding Swedish Patent Application No. 2250397-3.
Office Action Dated Oct. 19, 2022, for corresponding Swedish Patent Application No. 2250135-7.
Rafal Bogacz el al.; High Capacity Neural Networks for Familiarity Discrimination; Department of Computer Sciences, Department of Anatomy, University of Bristol, UK; 1999; vol. 2.
Susan S. Young el al.; Foveal Automatic Target Recognition Using a Multiresolution Neural Network; IEEE Transactions on Image Processing; Aug. 1998; pp. 1122-1135; vol. 7, No. 8.
Camunas-Mesa Luis A. et al: "A Configurable Event-Driven Convolutional Node with Rate Saturation Mechanism for Modular ConvNet Systems Implementation", Frontiers in Neuroscience, vol. 12, Feb. 20, 2018 (Feb. 20, 2018), pp. 1-19, XP093228823,CH.
Daniel Neil et al: "Deep Neural Networks and Hardware Systems for Event-driven Data" In: "Doctoral Thesis", Jul. 31, 2017 (Jul. 31, 2017), ETH Zurich,XP055571322, pp. 1-154.
Neil Daniel et al: "Minitaur, an Event-Driven FPGA-Based Spiking Network Accelerator", IEEE Transactions on Very Large Scaleintegration (VLSI) Systems, IEEE Service Center, Piscataway, NJ, USA, vol. 22, No. 12, Dec. 1, 2014 (Dec. 1, 2014), pp. 2621-2628, XP011565124, ISSN: 1063-8210, DOI: 10.1109/TVLSI.2013. 2294916 [retrieved on Nov. 20, 2014].
Japanese Office Action dated Mar. 25, 2025, Japanese Patent Application 2022-577150.
Search report dated Sep. 18, 2024 in GB application 2403874.7, Intellectual property Office UK.

* cited by examiner

Rigid Stimulus

Compliant Stimulus

COMPUTER-IMPLEMENTED OR HARDWARE-IMPLEMENTED METHOD OF ENTITY IDENTIFICATION, A COMPUTER PROGRAM PRODUCT AND AN APPARATUS FOR ENTITY IDENTIFICATION

TECHNICAL FIELD

The present disclosure relates to a computer-implemented or hardware-implemented method of entity identification, a computer program product and an apparatus for entity identification.

BACKGROUND

Entity identification is known from prior art. One technology utilized for performing entity identification is neural networks. One type of neural network that can be utilized for entity identification is the Hopfield network. A Hopfield network is a form of recurrent artificial neural network. Hopfield networks serve as content-addressable ("associative") memory systems with binary threshold nodes.

However, existing neural network solutions have poor performance and/or low reliability. Furthermore, the existing solutions take a significant time to train and therefore may require a lot of computer power and/or energy, especially for training. Moreover, existing neural network solutions may require a lot of storage space.

Therefore, there is a need for alternative approaches of entity identification. Preferably, such approaches provide or enable one or more of improved performance, higher reliability, increased efficiency, faster training, use of less computer power, use of less training data, use of less storage space, and/or use of less energy.

SUMMARY

An object of the present disclosure seeks to mitigate, alleviate or eliminate one or more of the above-identified deficiencies and disadvantages in the prior art and solve at least the above-mentioned problem. According to a first aspect there is provided a computer-implemented or hardware-implemented method of entity identification, comprising: a) providing a network of nodes with input from a plurality of sensors; b) generating, by each node of the network, an activity level, based on the input from the plurality of sensors; c) comparing the activity level of each node to a threshold level; d) based on the comparing, for each node, setting the activity level to a preset value or keeping the generated activity level; e) calculating a total activity level as the sum of all activity levels of the nodes of the network; f) iterating a)-e) until a local minimum of the total activity level has been reached; and g) when the local minimum of the total activity level has been reached, utilizing a distribution of activity levels at the local minimum to identify a measurable characteristic of the entity. The first aspect has the advantage that the effective structure of the network can change dynamically, which enables identification of a larger number of entities, e.g. per unit/node.

According to some embodiments, the input changes dynamically over time and follows a sensor input trajectory. One advantage thereof is that the method is less sensitive to noise. Another advantage is that identification is faster. A further advantage is that this enables more accurate identification.

According to some embodiments, the plurality of sensors monitor a dependency between sensors. This has the advantage that the method is less sensitive to noise.

According to some embodiments, a local minimum of the total activity level has been reached when a sensor input trajectory has been followed with a deviation smaller than a user-definable deviation threshold for a time period longer than a user-definable time threshold.

According to some embodiments, the activity level of each node is utilized as inputs, each weighted with a weight, to all other nodes, and wherein at least one weighted input is negative and/or wherein at least one weighted input is positive and/or wherein all kept generated activity levels are positive scalars.

According to some embodiments, the network is activated by an activation energy X, which impacts where the local minimum of the total activity level is.

According to some embodiments, the input from the plurality of sensors are pixel values, such as intensity, of images captured by a camera and wherein the distribution of activity levels across all nodes is further utilized to control a position of the camera by rotational and/or translational movement of the camera, thereby controlling the sensor input trajectory and wherein the entity identified is an object or a feature of an object present in at least one image of the captured images. One advantage thereof is that the method is less sensitive to noise. Another advantage is that identification is independent on absolute amount of time, e.g. absolute amount of time spent with each static camera image and the time spent between different such static camera images as the camera position changes.

According to some embodiments, the plurality of sensors are touch sensors and the input from each of the plurality of sensors is a touch event signal with a force dependent value and wherein the distribution of activity levels across all nodes are utilized to identify the sensor input trajectory as a new contact event, the end of a contact event, a gesture or as an applied pressure.

According to some embodiments, each sensor of the plurality of sensors is associated with a different frequency band of an audio signal, wherein each sensor reports an energy present in the associated frequency band, and wherein the combined input from a plurality of such sensors follows a sensor input trajectory, and wherein the distribution of activity levels across all nodes are utilized to identify a speaker and/or a spoken letter, syllable, word, phrase or phoneme present in the audio signal.

According to a second aspect there is provided a computer program product comprising a non-transitory computer readable medium, having thereon a computer program comprising program instructions, the computer program being loadable into a data processing unit and configured to cause execution of the method or any of the above mentioned embodiments when the computer program is run by the data processing unit.

According to a third aspect there is provided an apparatus for entity identification, the apparatus comprising controlling circuitry configured to cause: a) provision of a network of nodes with input from a plurality of sensors; b) generation, by each node of the network, of an activity level, based on the input from the plurality of sensors; c) comparison of the activity level of each node to a threshold level; d) based on the comparison, for each node, setting of the activity level to a preset value or keeping of the generated activity level; e) calculation of a total activity level as the sum of all activity levels of the nodes of the network; f) iteration of a)-e) until a local minimum of the total activity level has been reached; and g) when the local minimum of the total activity level has been reached, utilization of a distribution of activity levels at the local minimum to identify a measurable characteristic of the entity.

Effects and features of the second and third aspects are to a large extent analogous to those described above in connection with the first aspect and vice versa. Embodiments mentioned in relation to the first aspect are largely compatible with the second and third aspects and vice versa.

An advantage of some embodiments is that alternative approaches of entity identification are provided.

An advantage of some embodiments is that an improved performance of entity identification is achieved.

Another advantage of some embodiments is that a more reliable entity identification is provided.

Yet an advantage of some embodiments is that the apparatus is faster to train, e.g. since the apparatus is more general or more generalizable due to e.g. an improved dynamic performance.

Yet another advantage of some embodiments is that the processing elements are faster to train, e.g. since only a small set of training data is needed.

Yet another advantage is that the apparatus is capable of self-training, i.e. that a limited amount of initial training data is percolated in the apparatus so that its representations are fed through the network in new combinations, which enables a sort of "data augmentation", but in this case it is the internal representations, rather than tweaked sensor data, of the sensory information that is being replayed to the apparatus, providing for a more efficient self-training than provided by data augmentation.

Yet a further advantage of some embodiments is that an efficient or a more efficient method of identifying an entity is provided.

Yet another further advantage of some embodiments is that an energy efficient method of identifying an entity is provided, e.g. since the method saves computer power and/or storage space.

Yet another further advantage of some embodiments is that a bandwidth efficient method of identifying a piece of information is provided, e.g. since the method saves on the needed bandwidth to transmit data.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

Terminology—The term "measurable" is to be interpreted as something that can be measured or detected, i.e. is detectable. The terms "measure" and "sense" are to be interpreted as synonyms. The term entity is to be interpreted as an entity, such as physical entity or a more abstract entity, such as a financial entity, e.g. one or more financial data sets. The term "physical entity" is to be interpreted as an entity that has physical existence, such as an object, a feature (of an object), a gesture, an applied pressure, a speaker, a spoken letter, a syllable, a phoneme, a word or a phrase. The term "node" may be a neuron (of a neural network) or another processing element.

BRIEF DESCRIPTIONS OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

DETAILED DESCRIPTION

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

Figure 1:
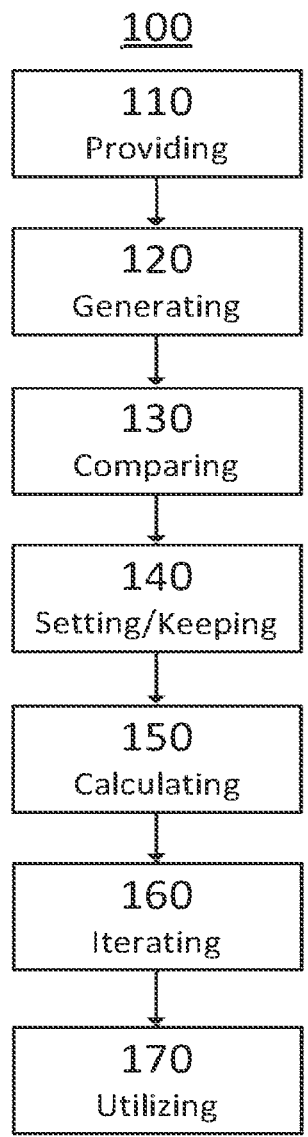
FIG. 1 is a flowchart illustrating example method steps according to some embodiments of the present disclosure.

In the following, embodiments will be described where FIG. 1 is a flowchart illustrating example method steps according to an embodiment of the present disclosure. FIG. 1 shows a computer-implemented or hardware-implemented method 100 of entity identification. Thus, the method may be implemented in hardware, software, or any combination of the two. The method comprises providing 110 a network 520 (shown in FIG. 5) of nodes 522, 524, 526, 528 with input 502, 504, 506, 508 from a plurality of sensors. The network 520 may be a recurrent network, such as a recurrent neural network. The sensors may be any suitable sensors; such as image sensors (e.g. pixels), audio sensors (e.g. microphones) or tactile sensors (e.g. pressure sensor arrays or biologically inspired tactile sensors). Furthermore, the input may be generated live, i.e. the sensors are directly connected to the network 520. Alternatively, the input is first generated and recorded/stored and then fed to the network 520. Furthermore, the input may have been pre-processed. One way of pre-processing the input is by combining (e.g. by averaging or addition of the signals) or recombining a plurality of sensor signals and utilizing such a combination or recombination of signals as one or more inputs to the network 520. In either case, the input data may continually change and evolve over time. Moreover, the method comprises generating 120, by each node 522, 524, 526, 528 of the network 520, an activity level, based on the input from the plurality of sensors. Thus, each node 522, 524, 526, 528 has an activity level associated with it. The activity level of a node represents the state, e.g. the internal state, of that node. Furthermore, the set of activity levels, i.e. the activity level of each node, represents the internal state of the network 520. The internal state of the network 520 may be utilized as a feedback signal to one or more actuators, which directly or indirectly control the input, thereby controlling a sensor input trajectory. Furthermore, the method comprises comparing 130 the activity level of each node 522, 524, 526, 528 to a threshold level, i.e. an activity level threshold. The threshold level may be any suitable value. The method comprises based on the comparing 130, for each node 522, 524, 526, 528, setting 140 the activity level to a preset value or keeping the generated activity level. In some embodiments, the generated activity level is kept if it is higher than the threshold level and the activity level is set to a preset value if the generated activity level is equal to or lower than the threshold level. The activity level may be set to a preset value of zero or to any other suitable value. Furthermore, the method comprises calculating 150 a total activity level as the sum of all activity levels of the nodes 522, 524, 526, 528 of the network 520. For the calculating, the set values are utilized together with any kept generated values. If the preset value is zero, the total activity level can be calculated as the sum of all kept generated values only, thus ignoring all zero values and therefore providing a faster calculation. Moreover, the method comprises iterating 160 the previously described steps 110, 120, 130, 140, 150 until a local minimum of the total activity level has been reached. The iteration is performed with continually evolving input signals, e.g. each input is a continuous signal from a sensor. The local minimum is reached when the lowest possible total activity level is reached. The lowest possible total activity level may be deemed to be reached when the total activity level goes below a total activity threshold value for a number of iterations. The number of iterations may be any suitable number, such as two. When the local minimum of the total activity level has been reached, a distribution of activity levels at the local minimum is utilized 170 to identify a measurable characteristic (or measurable characteristics) of the entity. A measurable characteristic may be a feature of an object, a part of a feature, a trajectory of positions, a trajectory of applied pressures, or a frequency signature of a certain speaker when speaking a certain letter, syllable, phoneme, word or phrase. Such a measurable characteristic may then be mapped to an entity. For example, a feature of an object may be mapped to an object, a part of a feature may be mapped to a feature (of an object), a trajectory of positions may be mapped to a gesture, a trajectory of applied pressures may be mapped to a (largest) applied pressure, a frequency signature of a certain speaker may be mapped to the speaker, and a spoken letter, syllable, phoneme, word or phrase may be mapped to an actual letter, syllable, phoneme, word or phrase. Such mapping may simply be a look up in a memory, a look up table or a database. The look up may be based on finding the entity of a plurality of physical entities that has the characteristic, which is closest to the measurable characteristic identified. From such a look up, the actual entity may be identified. When the local minimum has been reached, the network 520 follows the local minimum trajectory for a user-definable amount of time. The precision of the identification depends on the total amount of time spent following this local minimum trajectory.

In some embodiments, the input changes dynamically over time and follows a (temporal) sensor input trajectory or sensory trajectory. In some embodiments, the plurality of sensors monitor a dependency between sensors. Such a dependency may be due to the fact that the sensors are located in different parts of the same underlying substrate, e.g. the sensors are located close to each other and therefore measures different aspects of a signal that are related or dependent on each other. Alternatively, the quantities the sensors measure may have a dependency due to the laws that govern the world monitored by the sensors. For example, when the visual world is mapped to a set of sensor pixels of a first image (by a camera), two neighbouring sensors/pixels may have a high contrast in their intensity, but not all neighbouring sensors/pixels will have high intensity contrasts between them as the visual world is not composed that way. Hence, there may in the visual world be a certain degree of predictability or dependency that implies that if there is a high contrast in intensity between a central pixel and a first pixel e.g. the pixel to the left of the central pixel, but there is a much lower intensity contrast between the central pixel and the other neighbouring pixels (e.g. the pixel to the right of, the pixel above and the pixel below the central pixel), then this relationship may also be reflected in other images, such as a second image, i.e., also in the second image, there may be a high contrast in intensity between the central pixel and the first pixel, whereas there may be a much lower intensity contrast between the central pixel and the other neighbouring pixels.

In some embodiments, a local minimum of the total activity level has been reached when a sensor input trajectory has been followed with a deviation smaller than a user-definable deviation threshold for a time period longer than a user-definable time threshold. In other words, a local minimum of the total activity level has been reached when a sensor input trajectory has been followed sufficiently well over a sufficient amount of time by an internal trajectory, which is the trajectory followed by the nodes 522, 524, 526, 528. Thus, in some embodiments, the sensor input trajectory is replicated or represented by an internal trajectory. Furthermore, the local minimum is reached when the lowest possible total activity level is reached, i.e. when the total activity level (of the network 520) relative to the sum of the activity provided into the network 520 by the input from the plurality of sensors is as low as possible. As the deviation threshold and the time threshold are user-definable, a suitable precision may be selected by the user. Furthermore, as the deviation threshold and the time threshold are user-definable, an actual local minimum does not have to be reached or found, instead it is sufficient, depending on the set deviation threshold and the set time threshold, that the total activity level is in the proximity of or near the local minimum, thus allowing for deviations from the internal trajectory. Moreover, if the total activity level is not within the set deviation threshold and the set time threshold, the method optionally comprises the step of reporting that no entity can be identified with a suitable precision/certainty.

Figure 2:
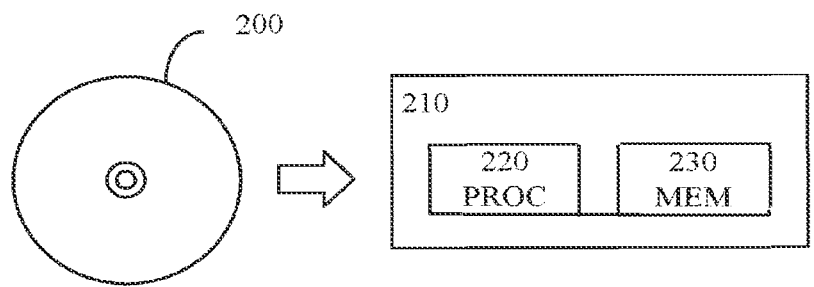
FIG. 2 is a schematic drawing illustrating an example computer readable medium according to some embodiments.

According to some embodiments, a computer program product comprises a non-transitory computer readable medium 200 such as, for example a universal serial bus (USB) memory, a plug-in card, an embedded drive, a digital versatile disc (DVD) or a read only memory (ROM). FIG. 2 illustrates an example computer readable medium in the form of a compact disc (CD) ROM 200. The computer readable medium has stored thereon, a computer program comprising program instructions. The computer program is loadable into a data processor (PROC) 220, which may, for example, be comprised in a computer or a computing device 210. When loaded into the data processing unit, the computer program may be stored in a memory (MEM) 230 associated with or comprised in the data-processing unit. According to some embodiments, the computer program may, when loaded into and run by the data processing unit, cause execution of method steps according to, for example, the method illustrated in FIG. 1, which is described herein.

Figure 3:
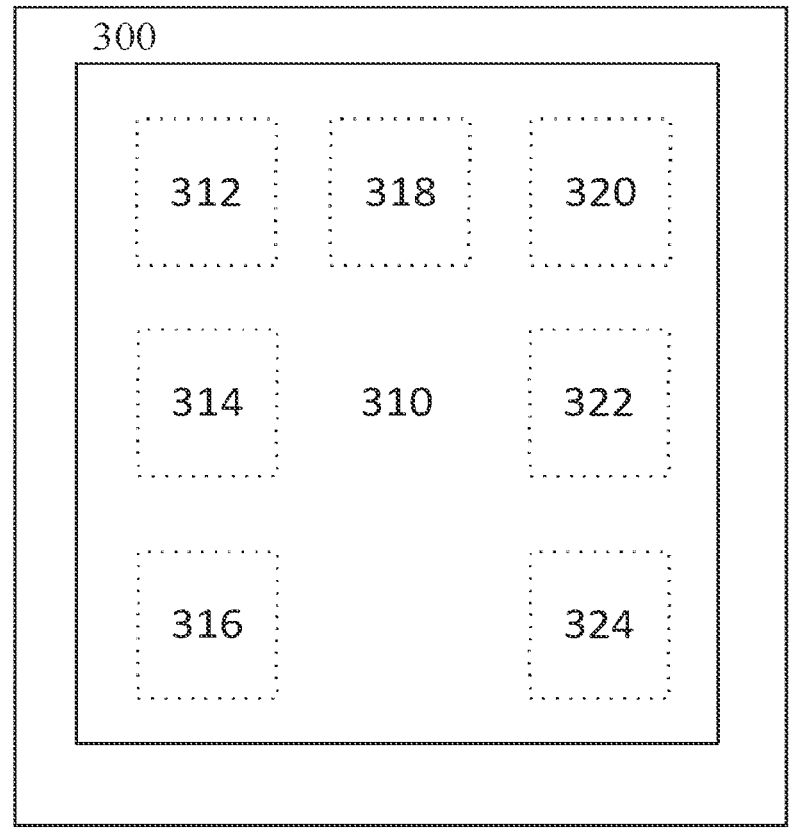
FIG. 3 is a schematic block diagram illustrating example apparatuses according to some embodiments.

FIG. 3 is a schematic block diagram illustrating example apparatuses according to some embodiments. FIG. 3 shows an apparatus 300 for entity identification. The apparatus 300 may be configured to cause performance of (e.g., perform) one or more of the method steps as illustrated in FIG. 1 or otherwise described herein. The apparatus 300 comprises controlling circuitry 310. The controlling circuitry 310 is configured to cause provision of a network 520 of nodes 522, 524, 526, 528 with input from a plurality of sensors (compare with step 110 of FIG. 1); to cause generation, by each node 522, 524, 526, 528 of the network 520, of an activity level, based on the input from the plurality of sensors (compare with step 120 of FIG. 1); to cause comparison of the activity level of each node 522, 524, 526, 528 to a threshold level (compare with step 130 of FIG. 1); to cause, based on the comparison, for each node 522, 524, 526, 528, setting of the activity level to a preset value or keeping of the generated activity level (compare with step 140 of FIG. 1); to cause calculation of a total activity level as the sum of all activity levels of the nodes 522, 524, 526, 528 of the network 520 (compare with step 150 of FIG. 1); to cause iteration of the provision, the generation, the comparison, the setting/keeping and the calculation until a local minimum of the total activity level has been reached (compare with step 160 of FIG. 1); and to cause, when the local minimum of the total activity level has been reached, utilization of a distribution of activity levels at the local minimum to identify a measurable characteristic of the entity (compare with step 170 of FIG. 1).

The controlling circuitry 310 may comprise, or be otherwise associated with, a provider (e.g., providing circuitry or a provision module) 312 which may be configured to provide a network of nodes with input from a plurality of sensors; a generator (e.g., generating circuitry or a generation module) 314, which may be configured to generate, by each node of the network, an activity level, based on the input from the plurality of sensors; a comparator (e.g., comparing circuitry or a comparison module) 316 which may be configured to compare the activity level of each node to a threshold level; a setter/keeper (e.g., setting/keeping circuitry or a set/keep module) 318 which may be configured to, based on the comparing, for each node, set the activity level to a preset value or keep the generated activity level; a calculator (e.g., calculating circuitry or a calculation module) 320 which may be configured to calculate a total activity level as the sum of all activity levels of the nodes of the network; an iterator (e.g., iterating circuitry or a iteration module) 322 which may be configured to iterate the provision, the generation, the comparison, the setting/keeping and the calculation until a local minimum of the total activity level has been reached; and a utilizer (e.g., utilizing circuitry or a utilization module) 324, which may be configured to utilize a distribution of activity levels at the local minimum to identify a measurable characteristic of the entity when the local minimum of the total activity level has been reached.

Figure 4:
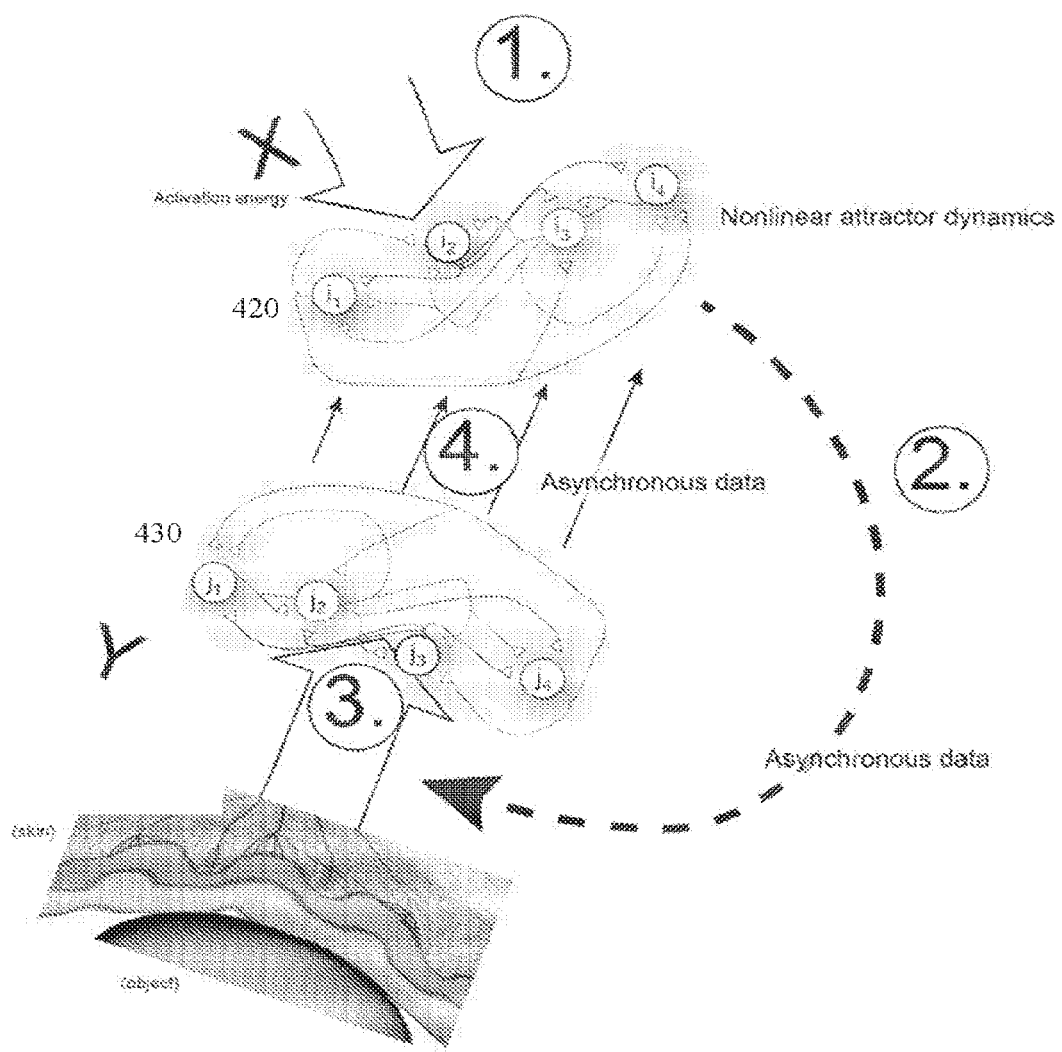
FIG. 4 is a schematic drawing illustrating the principle of operation of the apparatus using an example with multiple sensors and multiple processing elements according to some embodiments.

FIG. 4 illustrates the principle of operation of the apparatus using an example with multiple sensors and multiple nodes/processing elements according to some embodiments. At 1 in FIG. 4, a network 420 comprising the nodes i1, i2, i3 and i4 is activated by activation energy X. In some examples, as illustrated schematically in FIG. 4, the network of nodes i1, i2, i3, i4 exhibit nonlinear attractor dynamics. More specifically, the network of nodes is an attractor network. Furthermore, non-linearity is introduced by setting the activity level to a preset value based on the comparing 130 of the activity level of each node to a threshold level. The internal state of the network 420 equals the distribution of activity across the nodes i1-i4. The internal state continuously evolves over time according to the structure of the network 420. At 2 in FIG. 4, the internal state of the network 420 is utilized to either trigger movement that generates sensor activation, or merely perform a matrix operation on the sensor data. In some examples, as illustrated in FIG. 4, the network 420 generates asynchronous data which results in sensor activation. At 3 in FIG. 4, an external state of the surrounding world, shown schematically by way of example in FIG. 4 as an object being sensed by a plurality of sensors, for example, bio-touch sensors, is measured by sensors j1-j4 in a sensor network 430. In some embodiments, e.g. if the internal state of the network 420 is utilized to trigger movement that generates sensor activation (a change in sensor activation caused by actuator activation by the internal state), the relationship between the sensors and the external world may be changed. At 4 in FIG. 4, the sensor network 430 is shown generating, for example, asynchronous data which is fed into network 420. The sensors j1-j4 of the sensor network 430 are always dependent, mechanically and/or due to the physics in the outside world for visual or audio signals, and their dependencies can be compared to a network with state-dependent weights. The activation energy X will impact where the local minimum of the total activity level is. Furthermore, the activation energy X may also drive the output (the distribution of activity levels across all nodes) from i1-i4 to j1-j4 (or the actuators).

Hence, the activation energy X is useful for making the sensor input trajectory a function of the internal state, e.g. a function of the internal trajectory. Activation energy X may be an initial guess of a specific entity, i.e. an expectation, or it can be a request of a specific piece of information/entity for a given sensing condition, which is known to be composed of a combination of many entities.

Figure 5:
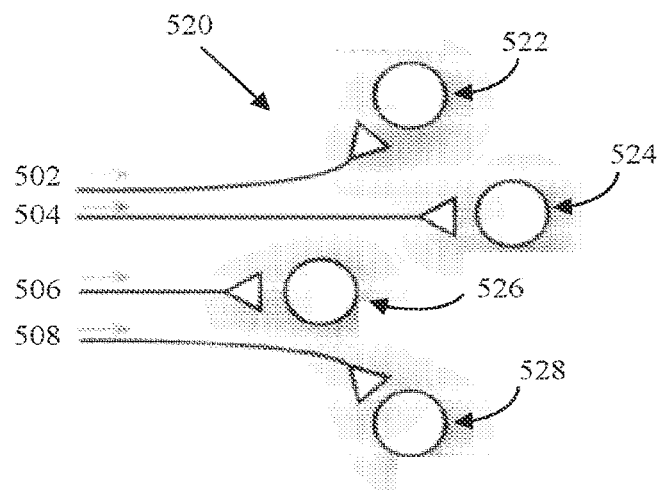
FIG. 5 is a schematic drawing illustrating the principle of operation of the apparatus using an example with multiple sensors and multiple processing elements according to some embodiments.

FIG. 5 illustrates the principle of operation of the apparatus with multiple sensors and multiple processing elements or nodes according to some embodiments. More specifically, FIG. 5 shows that each node of a network 520 of nodes 522, 524, 526, 528 has a respective input 502, 504, 506, 508 from a respective sensor (not shown).

Figure 6:
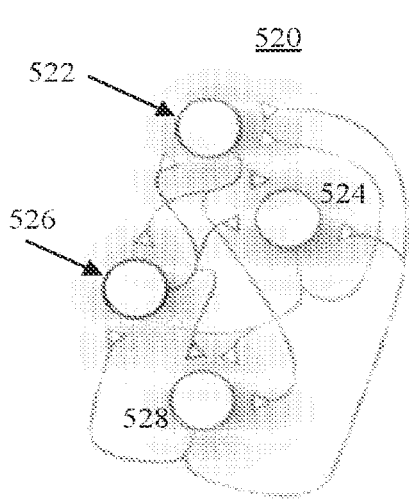
FIG. 6 is a schematic drawing illustrating the principle of operation of the apparatus using an example with multiple processing elements according to some embodiments.

FIG. 6 is a schematic drawing illustrating the principle of operation of the apparatus with multiple interconnected nodes or processing elements according to some embodiments. FIG. 6 shows a network 520 of nodes 522, 524, 526,

528, each node 522, 524, 526, 528 being connected to all other nodes 522, 524, 526, 528. If all nodes 522, 524, 526, 528 are connected to all other nodes 522, 524, 526, 528, a system/method with maximal potential variance may be obtained. Hence, a potential maximal richness of representation is enabled. In this scheme, each added node can be made to increase the richness of representation. For this to happen, the precise distribution of connection/weights between the nodes becomes an important permissive factor.

Figure 7:
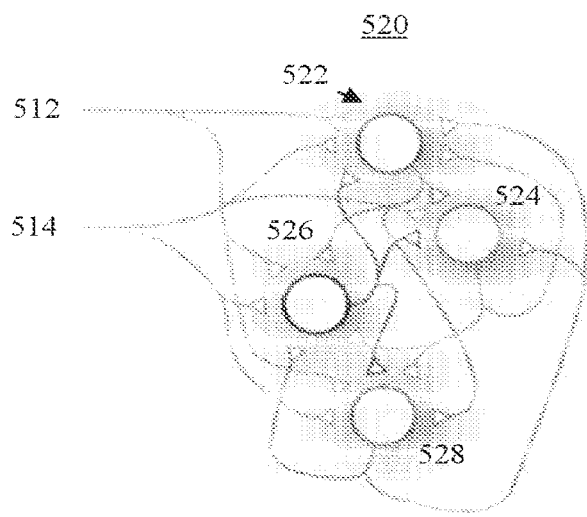
FIG. 7 is a schematic drawing illustrating the principle of operation of the apparatus using an example with multiple sensors and multiple processing elements according to some embodiments.

FIG. 7 is a schematic drawing illustrating the principle of operation of the apparatus using an example with multiple sensors and multiple nodes/processing elements according to some embodiments. FIG. 7 shows a network 520 of nodes 522, 524, 526, 528, each node 522, 524, 526, 528 being connected to all other nodes 522, 524, 526, 528 via connections. Furthermore, each node 522, 524, 526, 528 is provided with at least one input, such as inputs 512, 514 from a plurality of sensors. In some embodiments, the activity level of each node 522, 524, 526, 528 is utilized as inputs via the connections, each input being weighted with a weight (input weight e.g., a synaptic weight), to all other nodes 522, 524, 526, 528. At least one weighted input is negative. One way of achieving this is by utilizing at least one negative weight. Alternatively, or additionally at least one weighted input is positive. One way of achieving this is by utilizing at least one positive weight. In one embodiment, some of the nodes 522, 524 impact all other nodes with weights having a value from 0 to +1, whereas the other nodes 526, 528 impact all other nodes with weights having a value from −1 to 0. Alternatively, or additionally, all kept generated activity levels are positive scalars. By combining utilization of negative weights with all kept generated activity levels being positive scalars and with the preset value for setting all other activity levels being e.g. zero, at any point in time, some nodes (which were not below the threshold level at the previous point of time) can be below the threshold level for generating output, which means that the effective structure of the network can change dynamically during the identification process. In this embodiment, the method differs from methods utilizing Hopfield nets not just by applying a threshold for the activity level of each node, but also since the nodes of this embodiment only have positive scalar output, but can generate negative input. Furthermore, if all nodes/neurons are interconnected and all inputs from sensors target all nodes/neurons of the network, maximal richness of representation may be achieved. The input from sensors will in this case induce different states in the network, depending on the exact spatiotemporal pattern of the sensor input (and the time evolution of that pattern).

Furthermore, as explained above in connection with FIG. 1, the local minimum is reached when the lowest possible total activity level is reached, i.e. when the total activity level (of the network 520) relative to the sum of the activity provided into the network 520 by the input from the plurality of sensors is as low as possible. However, the most effective solution, simply setting all input weights to zero, will not work if the input from the plurality of sensors is a product of the activity of the nodes 522, 524, 526, 528 of the network 520 (and the nodes 522, 524, 526, 528 of the network are driven by activation energy X). In fact, each of the nodes 522, 524, 526, 528 of this network 520 also has a drive to actively avoid that all input weights going to zero. More specifically, in some embodiments, each of the nodes 522, 524, 526, 528 of the network 520 have means/mechanisms preventing that all their input weights become zero. Furthermore, in some embodiments, the network 520 has additional means/mechanisms preventing that all sensory input weights are zero.

Figure 8A:
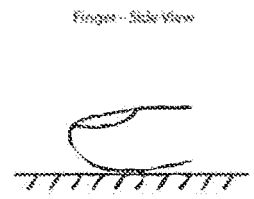
FIGS. 8A-8H are schematic drawings illustrating the principle of operation of the apparatus using an example with multiple tactile sensors according to some embodiments.
Figure 8E:
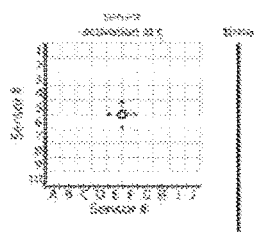
Figure 8E:
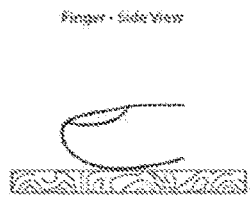
Figure 8B:
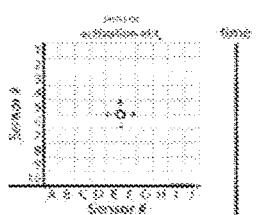
Figure 8B:
Figure 8F:
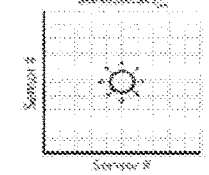
Figure 8F:
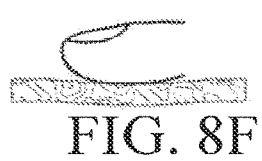
Figure 8C:
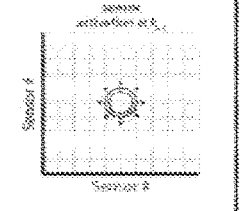
Figure 8C:
Figure 8G:
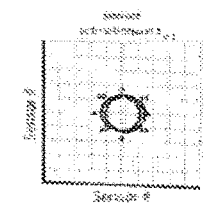
Figure 8G:
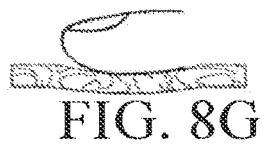
Figure 8D:
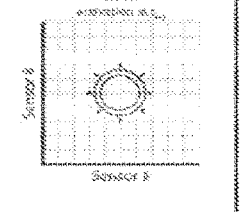
Figure 8D:
Figure 8H:
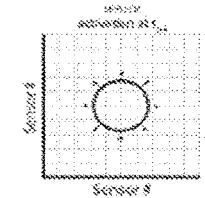
Figure 8H:

FIGS. 8A-8H are schematic drawings illustrating the principle of operation of the apparatus with multiple tactile sensors. More specifically, FIGS. 8A-8H show how the same type of sensor dependencies that define one dynamic feature can occur under two different sensing conditions, namely touch or stretch against a rigid surface and touch or stretch against a compliant surface. In some embodiments, the plurality of sensors is touch sensors or tactile sensors. The tactile sensors may be e.g. pressure sensor arrays or biologically inspired tactile sensors. Each of the tactile sensors, e.g. of an array, will sense whether a surface is touched or stretched, e.g. by a finger, a pen or another object, and is activated by a touch/stretch. The tactile sensors are located at the finger, pen or other object. If the tactile sensor is activated, it will output a touch event signal, e.g. +1. If the tactile sensor is not activated, it will output a no touch event signal, e.g. 0. Alternatively, if the tactile sensor senses that a surface is being touched, it will output a touch event signal with a force dependent value, e.g. a value between 0 and +1, whereas if the tactile sensor does not sense that a surface is being touched, it will output a no touch event signal, e.g. 0. The outputs of the tactile sensors are provided as inputs to a network 520 of nodes 522, 524, 526, 528. Thus, the input from each of the plurality of sensors is either a touch event (e.g. with a force dependent value) or a no touch event. In some embodiments, the surface touched/stretched is a rigid (non-compliant) surface. When e.g. a finger starts to touch the surface only one or a few tactile sensors of the array may sense this as a touch event as shown in FIG. 8A. Subsequently, when the compliant finger is pushed with a constant force onto the surface, it results in that the contact involves a larger surface area, whereby more sensors sense a touch event as shown in FIGS. 8B-8D. As shown in FIGS. 8A-8D, if the threshold level (utilizing the method described in connection with FIG. 1) is selected so that only the activity level of the nodes 522, 524, 526, 528 having input from the tactile sensors which receives the highest shear force, the only sensors for which the generated activity level is kept are the sensors in the intermediate zone represented by the edge/perimeter of the circle in FIGS. 8A-8D. Thus, as the finger is pushed against the surface at a constant force, the contact involves a gradually larger surface area, whereby the kept generated activity levels over time can be described as a wave travelling radially outwards, i.e. the sensor input trajectory followed is a radially outwards travelling wave that involves a predictable sequence of sensors' activation. As the finger is lifted and hence touches the surface less and less, the sensor input trajectory followed is a radially inwards travelling wave across the population of skin sensors. The trajectories can be utilized to identify a new contact event and/or the end of a contact event. The trajectories can also be utilized to distinguish between different types of contact events, e.g. by comparing a trajectory to trajectories of known contact events. Alternatively, both may follow the same overall trajectory, but adding several adjacent trajectory paths/trajectory components that may or may not be discovered by the system depending on the threshold for identification. By utilizing the trajectories for identification, a new contact event (or the end of a contact event) may be identified as the same type of spatiotemporal sequence, or qualitative event, regardless of the amount of finger force applied, and the resulting absolute levels of shear forces, i.e. regardless of how fast or slow the finger is applied to the surface (where the speed of the finger movement for example also can depend on the activation energy X described above). Furthermore, the identification is independent on whether one or a few sensors are malfunctioning/noisy or not, thus leading to a robust identification.

In some embodiments, the tactile sensors or the tactile sensor array touches/stretches against a compliant surface. With a compliant surface, the intermediate zone will instead grow as shown in FIGS. 8E-8H, and the intermediate zone will widen. However, the overall sensor activation relationship (sensor input trajectory) remains the same and the method will, provided the threshold level is set to a sufficiently allowing/low level, end up in the same local minima of the total system activity, and the contact-on feature (new contact event and/or the end of a contact event) is being identified. Alternatively, the distribution of activity levels across all nodes may be utilized to identify the sensor input trajectory as a gesture. A rigid surface may be utilized for identifying e.g. gestures and a compliant surface may be utilized for identifying e.g. a largest shear force applied to be in a certain interval.

Figure 9:
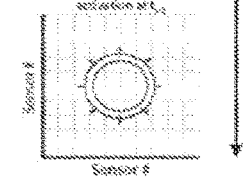
FIG. 9 is a schematic drawing illustrating the principle of operation of the apparatus using an example with a camera according to some embodiments.
Figure 9:
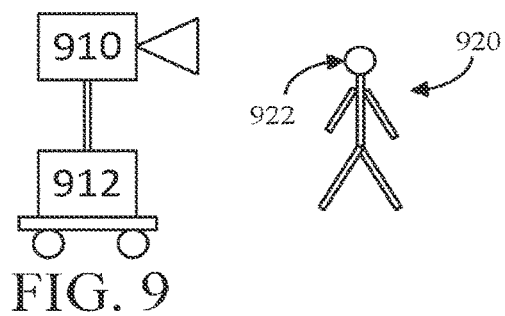

FIG. 9 is a schematic drawing illustrating the principle of operation of the apparatus together with a camera. In some embodiments, the inputs from the plurality of sensors are pixel values. The pixel values may be intensity values. Alternatively, or additionally, the pixel values may be one or more component intensities representing a color, such as red, green, and blue; or cyan, magenta, yellow, and black. The pixel values may be part of images captured by a camera 910 (shown in FIG. 9), such as a digital camera. Furthermore, the images may be images captured in a sequence. Alternatively, the images may be a subset of the captured images, such as every other image of a sequence. Utilizing the method described in connection with FIG. 1 while utilizing the distribution of activity levels across all nodes 522, 524, 526, 528 to control a position of the camera 910 by rotational and/or translational movement of the camera 910, the sensor input trajectory can be controlled. Rotational and/or translational movement may be performed with an actuator 912, such as one or more motors, configured to rotate/angle the camera and/or move the camera forward and back or from side to side. Thus, the distribution of activity levels across all nodes 522, 524, 526, 528 is utilized as a feedback signal to the actuator 912. In FIG. 9, the camera 912 has an object 920 in its field of focus. Thus, the object 920 will be present in one or more of the captured images. The object 920 may be a person, a tree, a house, or any other suitable object. By controlling the angle or the position of the camera, the input from the plurality of pixels is affected/changed. The sensor signals, i.e. the pixels, then becomes a function of the distribution of activity levels across all nodes 522, 524, 526, 528 and therefore of its own internal state. The active movement of the camera 912 generates a time-evolving stream of sensor input. Thus, the input changes dynamically over time and follows a sensor input trajectory. The sensor input trajectory is controlled by the movement of the camera 912 and when a local minimum of the total activity level has been reached, the distribution of activity levels at the local minimum is utilized to identify a measurable characteristic, such as a feature of an object or a part of a feature (of an object), of the entity, the entity being an object if the measurable characteristic is a feature of the object and the entity being a feature if the measurable characteristic is a part of a feature. The feature may be a biometric feature, such as a distance between two biometric points, such as the distance between the eyes of a person. Alternatively, the feature may be a width or a height of an object, such as a width or a height of a tree. In some embodiments, when the distance between the object 920 and the camera 912 increases, the number of pixels utilized as input may be decreased and vice versa, thereby ensuring that the object or a feature of the same object is identified as the same entity. As an example, if the distance between the object 920 and the camera 912 is doubled, only a quarter of the pixels utilized as input at the shorter distance, i.e. the pixels covering the object at the longer distance, are utilized as input at the longer distance. Thus, an object/entity can be identified as the same object/entity regardless of the distance, since the sensor dependencies when the camera sweeps across the object will be identifiable as being qualitatively the same, even though the number of engaged sensors/pixels will be fewer when the object is located further away. In another example, a feature to be identified is a vertical contrast line between a white and a black field. If the camera 912 sweeps across the vertical contrast line (e.g. from left to right), 4 sensors will discover the same feature (namely the vertical contrast line) as 16, or 64, sensors. Hence, there is a central feature element that becomes a specific type of sensor activation dependency, which travels across the sensors when the camera moves. Furthermore, the speed of camera movement may also be controlled. When the camera 912 moves with an increased speed, the pixels utilized as inputs may be from fewer images, such as from every other image, and vice versa, thereby ensuring that the object or the feature of the object is identified as the same entity independent of the speed. Moreover, the entity identification and/or the identification of a measurable characteristic of the entity may be associated with an acceptance threshold, i.e. when comparing with known physical entities or characteristics thereof, matching of the physical entities or the characteristics thereof (by means of the distribution of activity levels at the local minimum found) with actual physical entities or characteristics thereof in a memory, a look up table or a database, an acceptance threshold may be utilized to decide whether there is a match or not. The acceptance threshold may be set by a user, i.e. being user-definable. The utilization of an acceptance threshold ensures that a feature or an object can be the same even though the activity distribution across the sensors is not exactly the same. As the activity distribution across the sensors does not have to be exactly the same to decide whether there is a match or not, a correct identification can be reached even if one or a few sensors/pixels are malfunctioning or are noisy, i.e. there is a relative robustness to noise. Thus, a feature or an object can be identified at a near/short distance, but the same feature can also be identified at a larger distance, i.e. a feature or an object can be identified independent of the distance. The same reasoning applies to two different-sized objects at the same distance but with the same feature. In both cases the total sensor activity changes, but their overall spatiotemporal relation of activation can still be recognized.

Figure 10A:
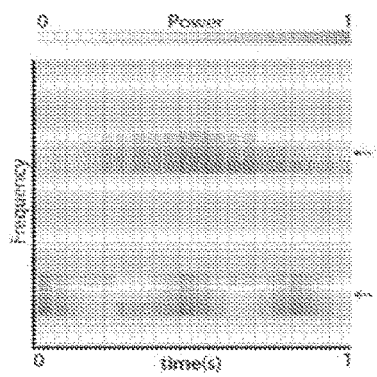
FIGS. 10A-10C are plots illustrating frequency and power for different sensors sensing an audio signal.
Figure 10B:
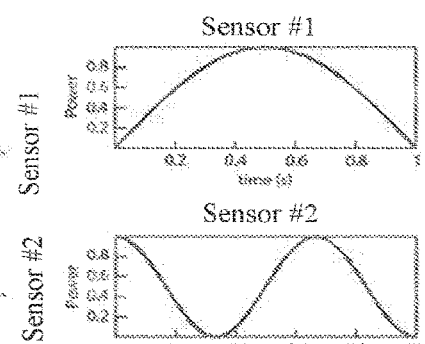
Figure 10C:
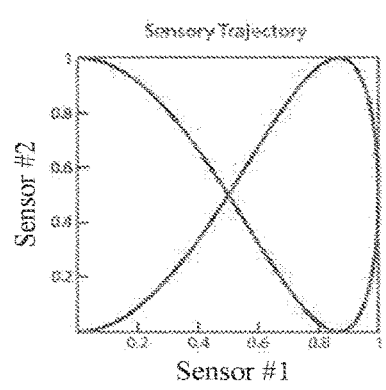

FIGS. 10A-10C illustrate frequency and power for different sensors sensing an audio signal. As can be seen from FIG. 10A, the frequency spectrum for an audio signal may be divided into different frequency bands. The power or energy in the different frequency bands can be sensed (and reported) by sensors. FIG. 10B shows the power in the frequency bands sensed by sensor 1 and sensor 2. As can be seen from this figure, each sensor senses a different frequency band. FIG. 10C shows a sensory trajectory based on the power sensed by sensor 1 and sensor 2 over time. The audio signal may comprise a sound from a voice (and possibly other sounds), which contains dynamic changes in power or energy across several frequency bands. Thus, for each spoken syllable, a voice can be identified as belonging to one particular individual (of a group of individuals) based on a specific dynamic signature. The dynamic signature comprises specific changes of the power level or the energy level in each frequency band over a period of time. Hence, by dividing the frequency spectrum into frequency bands, and having sensors sensing the power or energy in each frequency band or in each of a plurality of the frequency bands (with one or more sensors for each frequency band), dynamic signatures will create specific sensor input trajectories. Thus, the combined input from a plurality of such sensors follows a sensor input trajectory. In some embodiments, each sensor of the plurality of sensors is associated with a frequency band of an audio signal. Preferably, each sensor is associated with a different frequency band. Each sensor senses (and reports) a power or an energy present in the frequency band associated with it over a time period. Utilizing the method described in connection with FIG. 1 and reaching a local minimum, the distribution of activity levels across all nodes 522, 524, 526, 528 at the local minimum are utilized to identify a speaker. Alternatively, or additionally, the activity levels across all nodes 522, 524, 526, 528 may be utilized to identify a spoken letter, syllable, phoneme, word or phrase present in the audio signal. E.g. a syllable is identified by comparing the distribution of activity levels across all nodes 522, 524, 526, 528 at the local minimum found with stored distributions of activity levels associated with known syllables. Likewise, a speaker is identified by comparing the distribution of activity levels across all nodes 522, 524, 526, 528 at the local minimum found with stored distributions of activity levels associated with known speakers. An acceptance threshold as described in connection with FIG. 9 may also be applied to decide whether there is a match or not (for the syllable or the speaker). Furthermore, as a trajectory is followed and a local minimum is reached for the identification, the identification is independent of speed of the sound signal as well as of sound volume.

Figure 11:
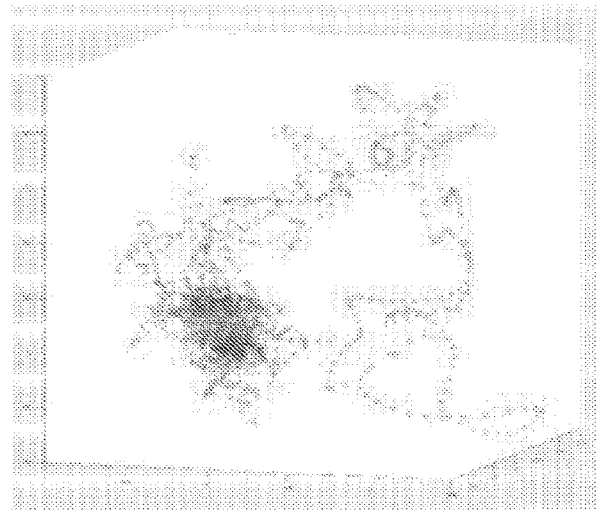
FIG. 11 is a plot of a sensory trajectory.

FIG. 11 is a plot of another sensor input trajectory. FIG. 11 shows a sensor input trajectory based on three sensors (sensor 1, sensor 2 and sensor 3) over time. As seen in FIG. 11, the measured values of sensor 1 over time are utilized as the X coordinates, whereas the measured values of sensor 2 over time are utilized as the Y coordinates, and the measured values of sensor 3 over time are utilized as the Z coordinates of a Cartesian coordinate system for a three-dimensional space. In one embodiment, the sensors are measuring different frequency bands of an audio signal. In another embodiment, the sensors are measuring whether there is a touch event. In yet another embodiment, the sensors are measuring intensity values of pixels. The plotted coordinates in FIG. 11 together constitute a sensory trajectory.

The person skilled in the art realizes that the present disclosure is not limited to the preferred embodiments described above. The person skilled in the art further realizes that modifications and variations are possible within the scope of the appended claims. For example, other entities such as aroma or flavor may be identified. Additionally, variations to the disclosed embodiments can be understood and effected by the skilled person in practicing the claimed disclosure, from a study of the drawings, the disclosure, and the appended claims.

The invention claimed is:

1. A computer-implemented method for identifying characteristics in time-varying information data representing at least one state of an entity, the method comprising: at a computer system on which a computer model comprising a network of interconnected nodes is executing:
providing the network of nodes with input, the input comprising time-varying information data representing a state of the entity, wherein the input changes over time responsive to the state of the entity changing;
generating, by each node of the network, an activity level, based on one or both of the input and an input combination of time-varying information data;
comparing the activity level of each node to a threshold level;
setting, based on the comparing, for each node, the activity level to a preset value or keeping the generated activity level;
calculating a total activity level as the sum of all activity levels of the nodes of the network;
determining if a condition for the calculated total activity level being a local minimum of the total activity level has been met; and
responsive to determining at a point in time that the condition for the calculated total activity level being a local minimum of the total activity level has not been met, outputting a control signal to cause the entity to change its stage and repeating over time the providing, generating, comparing, setting, calculating and outputting; and
responsive to determining the condition for the calculated total activity level being a local minimum of the total activity level has been met, utilizing a distribution of activity levels at the determined local minimum to identify one or more measurable characteristics of one or both of input time-varying information and input combination of time-varying information data representing at a state of the entity.

2. A computer program product for identifying characteristics in time-varying information data representing at least one state of an entity, the computer program product comprising a non-transitory, computer readable storage medium having program instructions embodied therewith, the program instructions being executable by a processor of a computer system to cause the processor to:
provide a network of nodes with input, the input comprising time-varying information data representing a state of the entity, wherein the input changes over time responsive to the state of the entity changing;
generate, by each node of the network, an activity level, based on one or both of the input and an input combination of time-varying information data representing a state of the entity;
compare the activity level of each node to a threshold level;
set, based on the comparing, for each node, the activity level to a preset value or keeping the generated activity level;
calculate a total activity level as the sum of all activity levels of the nodes of the network;
determine if a condition for the calculated total activity level being a local minimum of the total activity level has been met; and
responsive to determining at a point in time that the condition for the calculated total activity level being a local minimum of the total activity level has not been met, causing the computer system to output a control signal to cause the entity to change its stage and repeating, over time, the providing, generating, comparing, setting, calculating and outputting; and responsive to determining the condition for the calculated total activity level being a local minimum of the total activity level has been met, utilize a distribution of activity levels at the determined local minimum to identify one or more measurable characteristics of one or both of input time-varying information and input combination of time-varying information data representing at a state of the entity.

3. The computer-implemented method of claim 1, further comprising:
utilizing the generated set of activity levels of each node in the network in each repetition over time of the providing, generating, comparing, setting, and calculating, to generate at least one control signal to control one or more actuators to change the state of the entity.

4. The computer-implemented method of claim 1, further comprising:
utilizing the generated set of activity levels of each node in the network in each repetition over time of the providing, generating, comparing, setting, calculating and determining, to generate at least one control signal to control one or more actuators to change the state of the entity; and
causing the entity to change its state by providing the control signal to the one or more actuators, wherein the control signal causes the one or more actuators to cause a resulting change of state of the entity which directly or indirectly controls the input.

5. The computer-implemented method of claim 1, wherein the entity is a physical entity and the at least one state is a physical state of the physical entity, further comprising:
utilizing the generated set of activity levels of each node in the network in each repetition over time of the providing, generating, comparing, setting, calculating and determining, to generate at least one control signal to control one or more actuators to change the physical state of the physical entity.

6. The computer-implemented method of claim 1, wherein the entity is a physical entity and the at least one state is a physical state of the physical entity, further comprising:
utilizing the generated set of activity levels of each node in the network in each repetition over time of the providing, generating, comparing, setting, calculating and determining, to generate at least one control signal to control one or more actuators to change the physical state of the physical entity; and
causing the entity to change its state by providing the control signal to the one or more actuators, wherein the control signal causes the one or more actuators to cause a resulting change of physical state of the physical entity which directly or indirectly controls the input.

7. The computer-implemented method of claim 1, wherein the entity is a physical entity and the at least one state is a physical state of the physical entity, wherein the entity comprises one or more actuators which when actuated change the real-world state of the physical entity, further comprising:
utilizing the generated set of activity levels of each node in the network in each repetition over time of the providing, generating, comparing, setting, calculating and determining, to generate at least one control signal to control the one or more actuators to change the physical state of the physical entity; and
causing the entity to change its state by providing the control signal to the one or more actuators, wherein the control signal causes the one or more actuators to cause a resulting change of physical state of the physical entity which directly or indirectly controls the input.

8. The computer-implemented method of claim 1, wherein the input is sensed input, wherein entity is a physical entity and the at least one state is a physical state of the physical entity, wherein the entity comprises one or more sensor actuators which when actuated change the real-world state of the physical entity, further comprising:
utilizing the generated set of activity levels of each node in the network in each repetition over time of the providing, generating, comparing, setting, calculating and determining, to generate at least one control signal to control the one or more sensor actuators to change the physical state of the physical entity; and
causing the entity to change its state by providing the control signal to the one or more sensor actuators, wherein the control signal causes the one or more sensor actuators to cause a resulting change of physical state of the physical entity which directly or indirectly controls the sensor input.

9. The computer-implemented method of claim 1, wherein the input is sensed input, wherein entity is a physical entity and the at least one state is a physical state of the physical entity, wherein the entity comprises one or more sensor actuators which when actuated change the real-world state of the physical entity, further comprising:
utilizing the generated set of activity levels of each node in the network in each repetition over time of the providing, generating, comparing, setting, calculating and determining, to generate at least one control signal to control the one or more sensor actuators to change the physical state of the physical entity;
causing the entity to change its state by providing the control signal to the one or more sensor actuators, wherein the control signal causes the one or more sensor actuators to cause a resulting change of physical state of the physical entity which directly or indirectly controls the sensor input; and
wherein the physical entity an apparatus for entity identification comprising a camera, the apparatus being capable of movement, the sensed input representing movement of the apparatus and/or the camera, and wherein the sensor actuator is configured to cause movement of the apparatus and/or the camera.

10. The computer-implemented method of claim 1, wherein the input is sensed input, wherein entity is a physical entity and the at least one state is a physical state of the physical entity, wherein the entity comprises one or more sensor actuators which when actuated change the real-world state of the physical entity, further comprising:
utilizing the generated set of activity levels of each node in the network in each repetition over time of the providing, generating, comparing, setting, calculating and determining, to generate at least one control signal to control the one or more sensor actuators to change the physical state of the physical entity;
causing the entity to change its state by providing the control signal to the one or more sensor actuators, wherein the control signal causes the one or more sensor actuators to cause a resulting change of physical state of the physical entity which directly or indirectly controls the sensor input; and
wherein the physical entity is an imaging system, the sensed input comprises image data representing an image or images captured by the imaging system, and the sensor actuator is configured to cause change in the imaging system which causes one or more characteristics of the image or images captured by the imaging system to change.

11. The computer-implemented method of claim 1, wherein the input is sensed input, wherein entity is a physical entity and the at least one state is a physical state of the physical entity, wherein the entity comprises one or more sensor actuators which when actuated change the real-world state of the physical entity, further comprising:
utilizing the generated set of activity levels of each node in the network in each repetition over time of the providing, generating, comparing, setting, calculating and determining, to generate at least one control signal to control the one or more sensor actuators to change the physical state of the physical entity;
causing the entity to change its state by providing the control signal to the one or more sensor actuators, wherein the control signal causes the one or more sensor actuators to cause a resulting change of physical state of the physical entity which directly or indirectly controls the sensor input; and
wherein the physical entity is a physical system capable of generating audio data, the sensed input comprises or is derived from audio data generated by the physical system, and the sensor actuator is configured to cause a change of state of the physical entity which causes a change in one or more characteristics of the audio data generated by the physical entity.

12. The computer-implemented method of claim 1, wherein the input is sensed input, wherein entity is a physical entity and the at least one state is a physical state of the physical entity, wherein the entity comprises one or more sensor actuators which when actuated change the real-world state of the physical entity, further comprising:
utilizing the generated set of activity levels of each node in the network in each repetition over time of the providing, generating, comparing, setting, calculating and determining, to generate at least one control signal to control the one or more sensor actuators to change the physical state of the physical entity;
causing the entity to change its state by providing the control signal to the one or more sensor actuators, wherein the control signal causes the one or more sensor actuators to cause a resulting change of physical state of the physical entity which directly or indirectly controls the sensor input; and
wherein the physical entity is an apparatus for entity identification comprising a camera and the inputs from the plurality of sensors are pixel values, wherein the apparatus is capable of movement and the sensed input represents movement of the apparatus and/or the camera, wherein the sensor actuator is configured to cause movement of the apparatus and/or the camera, and wherein the apparatus is configured to identify an object or a feature of an object as the same entity independent of the speed of movement of the camera mounted on the apparatus by changing the pixels utilized as inputs to be from fewer images when the camera moves with an increased speed.

13. The computer-implemented method of claim 1, wherein the input is sensed input, wherein entity is a physical entity and the at least one state is a physical state of the physical entity, wherein the entity comprises one or more sensor actuators which when actuated change the real-world state of the physical entity, further comprising:
utilizing the generated set of activity levels of each node in the network in each repetition over time of the providing, generating, comparing, setting, calculating and determining, to generate at least one control signal to control the one or more sensor actuators to change the physical state of the physical entity;
causing the entity to change its state by providing the control signal to the one or more sensor actuators, wherein the control signal causes the one or more sensor actuators to cause a resulting change of physical state of the physical entity which directly or indirectly controls the sensor input; and
wherein the physical entity is an apparatus for entity identification comprising a camera, the apparatus capable of movement, the sensed input representing movement of the apparatus and/or the camera, and wherein the sensor actuator is configured to cause movement of the apparatus and/or the camera, wherein the apparatus is configured to identify an object or a feature of an object as the same entity independent of the distance of the object or the feature of the object from one or both of: the apparatus and the camera mounted on the apparatus.

* * * * *